W. GRIES.

ANTISKID TIRE CHAIN.

APPLICATION FILED SEPT. 25, 1920.

Reissued Aug. 30, 1921.

15,183.

Inventor

William Gries.

By his Attorney

J. C. Fowler.

UNITED STATES PATENT OFFICE.

WILLIAM GRIES, OF NEWARK, NEW JERSEY.

ANTISKID TIRE-CHAIN.

15,183. Specification of Reissued Letters Patent. Reissued Aug. 30, 1921.

Original No. 1,207,540, dated December 5, 1916, Serial No. 871,773, filed November 12, 1914. Application for reissue filed September 25, 1916. Serial No. 412,872.

*To all whom it may concern:*

Be it known that I, WILLIAM GRIES, a citizen of the United States, and resident of Newark, in the county of Essex and State of New Jersey, have invented a new and useful Antiskid Tire-Chain, of which the following is a specification.

This invention relates to the subject of anti-skidding devices for automobile tires and has special references in a novel accessory of this character of the chain type.

A primary object of the invention is to provide an antiskid chain attachment for wheels which may be readily and conveniently applied and having the several units thereof so arranged and mounted that each unit is free to adapt or adjust itself to the varying tractive conditions imposed thereon. In this connection, the invention has specially in view a tire-chain construction wherein each tread chain unit possesses an individuality in the particular of having an independent mounting so that the movement thereof when adapting itself to the traction will not be communicated to the other units so as to create a disturbance in the general operative positions thereof. At the same time, it is the purpose of the invention to provide a common flexible retaining means for all of the tread chain units whereby the same will be held with security upon the wheel and always in their proper relative positions.

A further object of the invention is to provide a novel tire chain construction wherein any one of the tread chain units may be readily removed and replaced, and the number of such units multiplied to any extent desired according to the degree of traction required.

A more general object of the invention is to provide an anti-skid chain attachment which shall be simple, strong, and durable and at the same time economically manufactured and repaired.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which:—

Similar reference characters designate corresponding parts throughout the several figures of the drawings.

Figure 1:
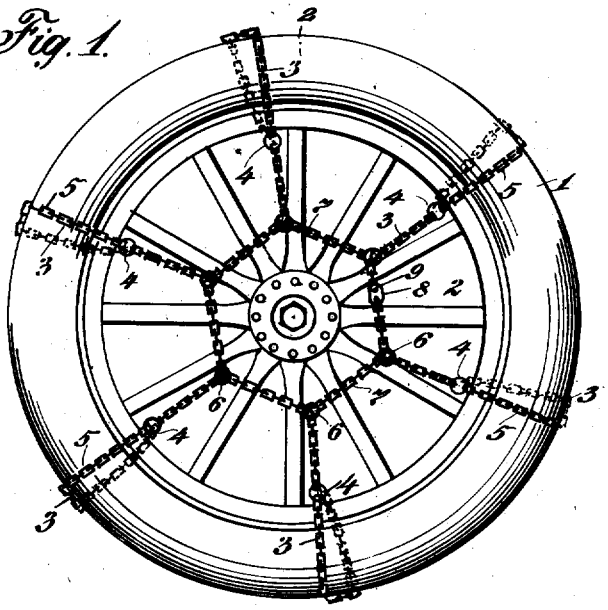
Figure 1 is an elevation of an auto-wheel and tire showing the application of one form of my invention.
Figure 2:
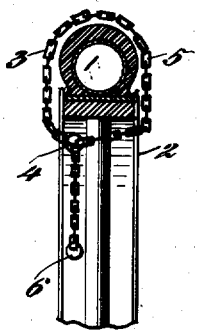
Fig. 2 is a cross-section on the line 2—2 of Fig. 1, showing in detail one of the tread chain units.

The essential features of the present invention which are fundamental to the successful operation thereof may be embodied in different forms of construction, so for illustrative purposes there are shown in the drawings different forms of the improved tire chain attachment. The primary form of the invention is illustrated in Figs. 1 and 2 of the drawings, and referring first to that embodiment of the invention, it will be noted by reference to these figures that the chain attachment includes in its organization any desired number of tread-chain units that are adapted to be loosely engaged with and about the tire 1 of the wheel 2.

Each of these units consists of a stout chain of suitable length, and the links of which chain are freely and loosely interlocked in the manner of an ordinary chain. This tread chain or chain length 3 carries at one end thereof a relatively large noose ring 4 through which the chain is loosely strung so as to provide an adjustable tire noose 5 which is adapted to be looped about the tire 1. The other end of the tread chain or chain length 3 carries a relatively smaller retaining ring 6 which may be passed through the ring 4, and which is adapted to loosely and slidably receive a floating flexible retaining or holding chain 7 which is common to all of the tread chain units and the ends of which are connected together by an adjustable fastening device 8 of any suitable character, such as a turnbuckle or its equivalent. Such equivalent form is shown in Fig. 1 of the drawings as consisting of a link attached to the chain ends by means of bolts 9. This chain 7 not only holds the tread chains 3 in proper spaced relation but at the same time draws the noosed chain lengths 4 about the tread and felly in such a manner that the loops are maintained in a substantially taut condition thereby preventing any unnecessary looseness.

It may be further noted in connection with the flexible retaining or holding chain 7 which goes through the rings 6, that the same provides for maintaining the tread chain units in their relative position regardless of the fact that any one of them may temporarily become slack for one reason or another, and furthermore, insures against any one of the chains becoming accidentally disconnected from this cause.

Thus, the present invention clearly distinguishes from devices wherein the tread chains are connected with an inflexible metallic retainer or holding device located near or about the hub, and wherein it is possible for any one of the tread chains to become loose, and (on account of the remaining cross chains being held in the same relative position by the inflexible holding device) to be thereby relatively lengthened sufficiently to swing out farther from the hub and to damage the mud guard or other part of the machine, especially if the latter is traveling at a good rate of speed.

By the use of my invention, on the contrary, where each tread chain encircles the rim to form a self-adjusting loop by the retaining ring being passed through the noose ring and the former being strung on the flexible holding and floating ring (in lieu of a hook or ring attachment thereto),—upon the floating ring being adjusted, the same will be held under sufficient tension to normally maintain the said self-adjusting loops substantially taut, and in case of the breakage of one of the tread units, the remaining cross chains will be held under a less but substantially equal tension by the sliding of the retaining rings upon the floating ring, and by being drawn inwardly the broken tread chain will be held nearer the hub than could otherwise be the case.

Figure 4:
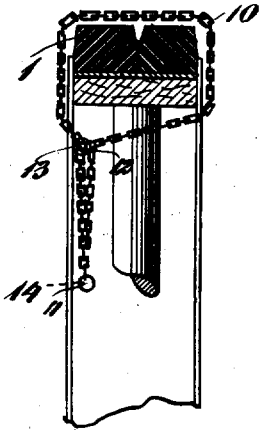
Fig. 4 is a view similar to Fig. 2 showing the modified tread chain more clearly.
Figure 3:
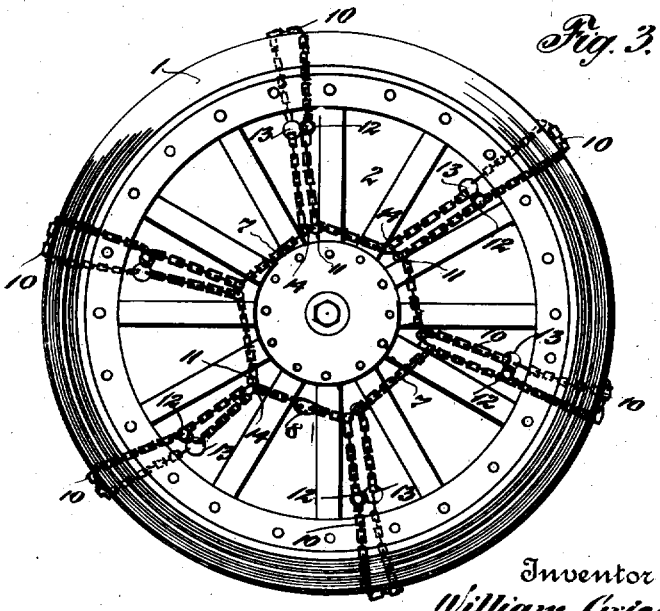
Fig. 3 is a view similar to Fig. 1, showing a modified form of the attachment.

In the modification shown in Figs. 3 and 4 the tread chain units each comprise a chain length 10 similar to chains 3, but in the present instance both ends of the tread chains are connected with the common flexible retaining chain 7, whereas in the other form only one end is connected with this element while the other holds a ring for forming a chain noose or loop. That is to say each chain length 10 of the modified construction is provided at one end with a retaining ring 11 and at a suitable distance therefrom is also provided with an intermediate coupling ring 12 which holds a noose ring 13, while the other end has affixed thereto a second retaining ring 14. In this case, as in the other, the said ring 14 is of such a diameter that it may pass freely through the noose ring 13 so that both retaining rings 11 and 14 may receive the common flexible retaining chain 7, after the chain length has formed a noose about the tire.

This modified construction reinforces and increases the durability of the device, and at the same time not only materially aids in maintaining the individual tread chain units in their relative position around the tread but also tends to keep the slip joint formed by the rings 12 and 13 from working to the inside of the wheel, because the portion of the chain between the rings 11 and 12 is always maintained in a taut condition. Furthermore, this arrangement prevents the noose from becoming so tight about the tread that it will cut into the tire, as may happen when the chain is so tight that it cannot move slightly during the rotation of the wheel.

From the foregoing description it is believed to be apparent that the present invention has many advantages over the type of tire chain that merely fits about the tire loosely and has no central tightening and holding element, and which is rendered practically useless by the breaking of one of the tread chains. The tread chains 3 of the present invention are readily removable and replaceable as individual units and therefore present a practical and efficient tire accessory that is durable and easily kept in good condition.

Furthermore, it will be apparent that the tread chain units and common flexible locking chains coöperate to provide elements of the same character. That is, the tread chain units are each individually adjustable and are held in position by an adjustable locking chain, which in the act of its own adjustment draws the noose of each unit taut.

It is thought that many other features and advantages of the invention will be readily apparent without further description, and it will of course be understood that various changes in the form, proportion, and minor details of construction may be resorted to without departing from the spirit of the invention or scope of the appended claims.

I claim—

1. In a device of the class described, a plurality of tread chain units, each having a retaining ring at each end and an intermediate noose ring for receiving one of said retaining rings to form a noose to encircle the tire, and a common flexible retaining chain adapted after the nooses have been formed by the several chain units to pass through the retaining rings of each of the latter to hold the same in position, and means for adjusting the operative length of the common chain.

2. In a device of the class described, a plurality of spaced radially disposed tread chain units, each having a retaining ring at each end, and an intermediate noose ring for receiving one of said retaining rings to form a noose to encircle the tire, and a common central flexible retaining chain ring adapted after the several nooses are formed to pass through the retaining rings of each of the chain units to hold the nooses in place, and manually actuated means for adjusting the operative length and tension of the chain ring.

3. In a device of the class described, a plurality of tread chain units, each having a retaining ring at each end and an intermediate noose ring for receiving one of said retaining rings to form a noose to encircle the tire, and a common flexible retaining chain adapted after the nooses have been formed by the several chain units to pass through the retaining rings of each of the latter to hold the same in position.

4. In a device of the class described, a wheel, a plurality of spaced radially disposed tread chain units each having at the ends thereof retaining means comprising rings, and an intermediate larger noose for receiving one of the retaining rings to form a noose with a slip joint to encircle the tire, and a common central flexible retaining chain ring adapted after the several nooses are formed to pass through the retaining rings of the tread chain units to hold the nooses in place and to maintain the slip joints in proper relative position on the outside of the wheel.

5. In a device of the class described, a wheel, a plurality of spaced radially disposed tread chain units each having at the ends thereof retaining means comprising rings, and an intermediate larger noose ring for receiving one of the retaining rings to form a noose with a slip joint to encircle the tire, a common central flexible retaining chain ring adapted after the several nooses are formed to pass through the retaining rings of the tread chain units to hold the nooses in place and to maintain the slip joints in proper relative position on the outside of the wheel, and means for adjusting the operative length of the common chain ring.

Signed at Newark, in the county of Essex, and State of N. J., this 3rd day of Sept., 1920.

WILLIAM GRIES.